United States Patent
Frisch et al.

[11] 3,766,006
[45] Oct. 16, 1973

[54] RAPIDLY REFUELABLE NUCLEAR REACTOR

[75] Inventors: Erling Frisch, Pittsburgh; Harry N. Andrews, Export, both of Pa.

[73] Assignee: Westinghouse Electric Corporation, Pittsburgh, Pa.

[22] Filed: July 8, 1970

[21] Appl. No.: 53,201

[52] U.S. Cl. .............................. 176/36 R, 310/14
[51] Int. Cl. ............................................. G21c 7/08
[58] Field of Search ...................... 176/36; 335/229; 310/12, 13, 14

[56] References Cited
UNITED STATES PATENTS

| | | | |
|---|---|---|---|
| 3,559,011 | 1/1971 | Edwards | 176/36 R |
| 3,260,870 | 7/1966 | Beach, Jr. et al. | 310/14 |
| 2,975,119 | 3/1961 | Emmons | 176/36 R |
| 3,162,796 | 12/1964 | Schreiber et al. | 176/36 R |

FOREIGN PATENTS OR APPLICATIONS

| | | | |
|---|---|---|---|
| 1,216,449 | 5/1966 | Germany | 176/36 R |

Primary Examiner—Harvey E. Behrend
Attorney—A. T. Stratton, Z. L. Dermer and M. B. L. Hepps

[57] ABSTRACT

A nuclear reactor in which the control rods are held withdrawn or retracted from the fuel by a permanent magnet during refueling. The reactor includes a missile shield which restrains the control rod units from being ejected upwardly during normal operation of the reactor. During refueling the shield is retracted. During normal operation the control rods, when withdrawn, are held by an electromagnet whose coil may be readily deenergized for rod insertion at any time. During refueling the retraction of the shield causes a permanent magnet to replace the electromagnet core.

5 Claims, 6 Drawing Figures

Patented Oct. 16, 1973

WITNESSES
Alfred G. Colaizzi
James F. Young

INVENTORS
Erling Frisch
Harry N. Andrews

ATTORNEY

RAPIDLY REFUELABLE NUCLEAR REACTOR

CROSS REFERENCE TO RELATED APPLICATIONS

This application relates to the following applications concurrently filed herewith and which are assigned to the same assignee as the present invention:

Ser. No. 53,207 entitled "Means for Rapidly Exposing The Core of A nuclear Reactor For Refueling" by Erling Frisch and Harry N. Andrews.

Ser. No. 53,203 entitled "Cable Support Structure For Enabling A Nuclear Reactor To Be Refueled Rapidly" by Erling Frisch and Harry N. Andrews.

Ser. No. 53,200 entitled "Combination of Nuclear Reactor and Missile Shield" by Erling Frisch and Harry N. Andrews.

Ser. No. 53,199, now U.S. Pat. No. 3,685,123 entitled "Means For Retaining and Handling Reactor O-Ring Seals" by Erling Frisch.

Ser. No. 53,198 entitled "Hydraulic Head Closure Mechanism" by Erling Frisch and Harry N. Andrews.

Ser. No. 53,202 entitled "Rapidly Refuelable Nuclear Reactor" by Harry N. Andrews and Richard S. Orr.

BACKGROUND OF THE INVENTION

Nuclear reactors include nuclear fuel clusters penetrated by control rods which control the neutron flux through the fuel. For convenience a nuclear reactor may be regarded as an elongated generally cylindrical structure positioned with its axis vertically and the control rods axially. The control rods are retracted from controlling relationship with the fuel by upward movement. For retraction each control rod assembly is provided with a piston which operates in a cylinder. When pressure under the piston is greater than pressure above it, the piston and control rods are moved so as to retract the control rods from controlling relationship with the fuel. When the pressure is equalized the control rods are returned by gravity to controlling relationship with the fuel.

In accordance with the teachings in Applicants' copending application Ser. No. 700,121 now U.S. Pat. No. 3,607,629 filed Jan. 24, 1968 for Drive Mechanism for Control Elements electromagnets are provided for holding each piston and the control rods connected to it in the retracted position independently of the pressure, in the piston cylinder. When it is desired to return the rods to controlling relationship with the fuel, the electromagnets are deenergized.

During rapid refueling all control rods are retracted out of controlling relationship and stored in the upper internals of the reactor and in the drive mechanism housings during the time when the upper package of the reactor is removed for refueling. The upper package includes the upper internals, the closure head, closure mechanisms, the control rod units and the drive mechanisms. It is essential that the control rod holding means not fail during this time since the release of even one rod would cause a substantial increase in the refueling time. The holding electromagnets now available do not meet this rigid requirement. The coils may be energized during the refueling but the possibility exists that a coil may become accidentally deenergized releasing the corresponding control rods.

It is an object of this invention to overcome the above described difficulty and to provide for effectively and reliably holding the control rods in the retracted position during refueling.

SUMMARY OF THE INVENTION

In accordance with this invention the holding of the control rods in the retracted position is effected during refueling by holding means which operates separately from the electromagnet means to hold the control rods retracted. The nuclear reactor has a missile shield which restrains or intercepts the control rod drive housing in the event of a major break and prevents the penetration by this housing of the dome of the vapor container. The missile shield also prevents damage to the control rod mechanisms during a seismic disturbance. In the practice of this invention the missile shield is vertically movable and is placed in its upper position during refueling. In accordance with this invention this movement of the missile shield causes the holding electromagnet means to be replaced by permanent magnet means. The control rod assembly is held retracted during the refueling by the permanent magnet means. After the refueling is completed the missile shield is displaced downwardly to its normal position, replacing the holding permanent magnet means by the electromagnetic holding means which can then be readily deenergized.

BRIEF DESCRIPTION OF THE DRAWINGS

For a better understanding of this invention, both as to its organizaion and as to its method of operation, together with additional objects and advantages thereof, reference is made to the following description taken in connection with the accompanying drawings, in which.

DETAILED DESCRIPTION OF THE EMBODIMENT

Figure 1:
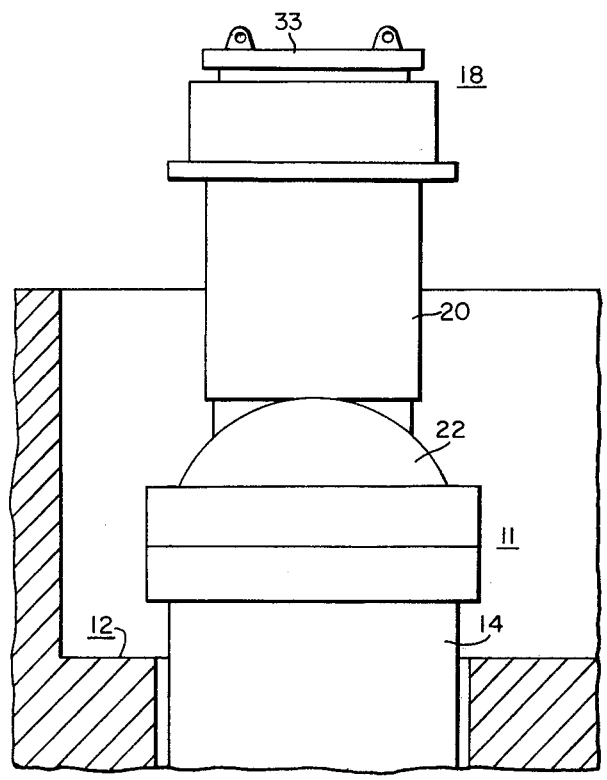
FIG. 1 is a view, partly in side elevation, and partly diagrammatic of a nuclear reactor in accordance with this invention.

The apparatus shown in the drawings is a nuclear reactor 11 which is mounted in a pit 12, the reactor 11 includes in the lower part 14 thereof a core 13 (FIG. 2) having fuel into which control rods 15 (FIGS. 2 and 3) are inserted by a control rod drive mechanism cluster 17 of the type disclosed in application 700,121 now U.S. Pat. No. 3,607,629). Above the control rod drive mechanism cluster 17 there is a missile shield assembly 18 which intercepts parts of the drive mechanism that might be projected in case of a major break and also prevents damage to the mechanisms during a seismic disturbance. The drive mechanisms for the control rods are enclosed in a container (20) supported on the dome shaped reactor closure head (22).

Figure 5:
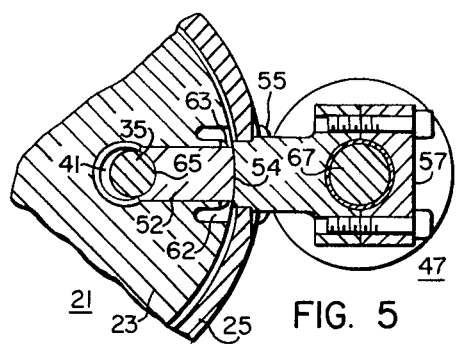
FIG. 5 is a fragmental view in section taken along line V—V of FIG. 4.
Figures 2, 2A:
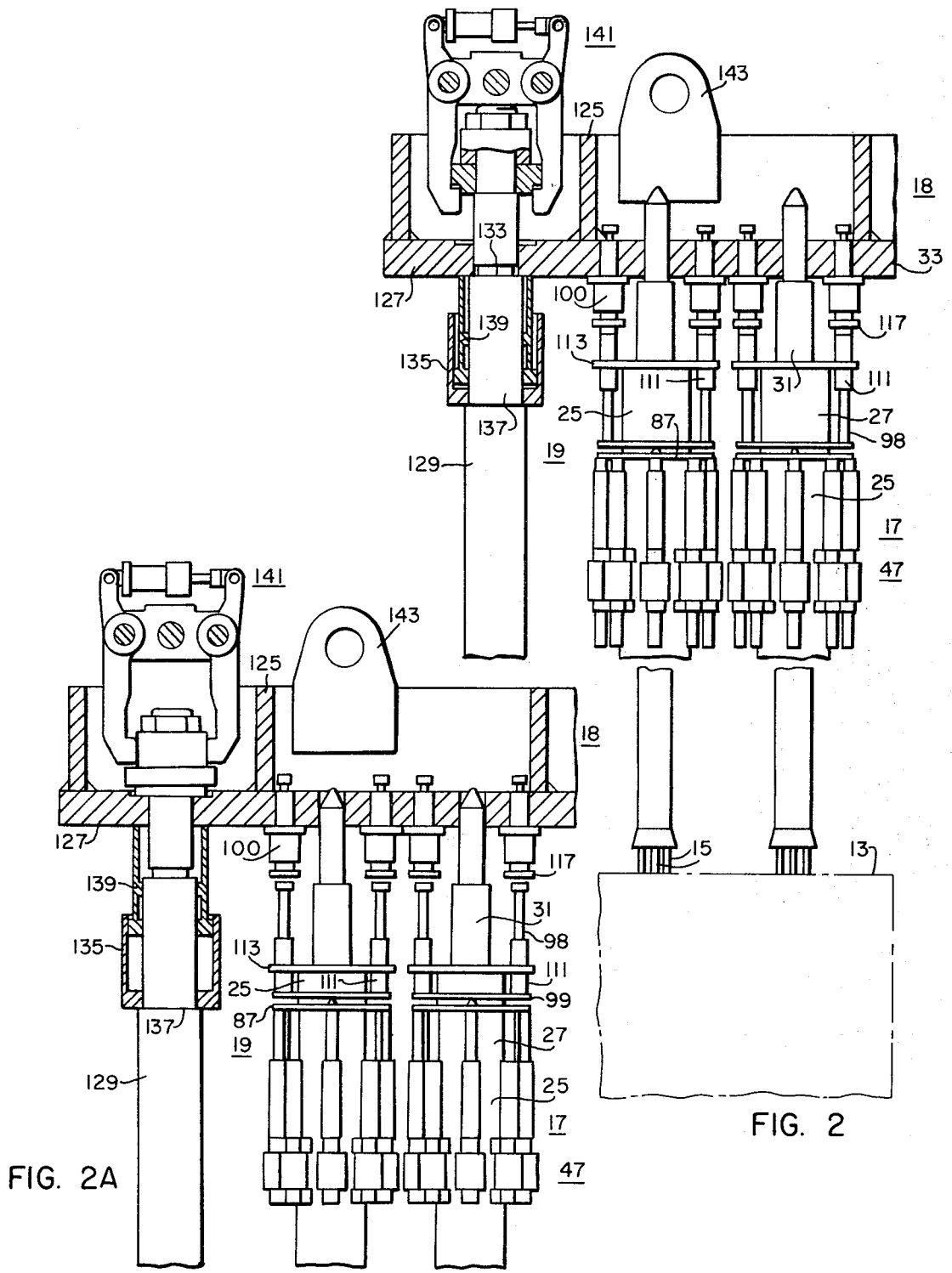
FIG. 2 is a view, partly in side elevation, partly in section, and partly in block diagram showing the relationship of the missle shield and the control rod driving mechanism in a nuclear reactor in accordance with this invention in normal operating condition.
FIG. 2A is a view of the upper part of the reactor as shown in FIG. 2 but with the missile shield positioned for reactor refueling.
Figure 3:
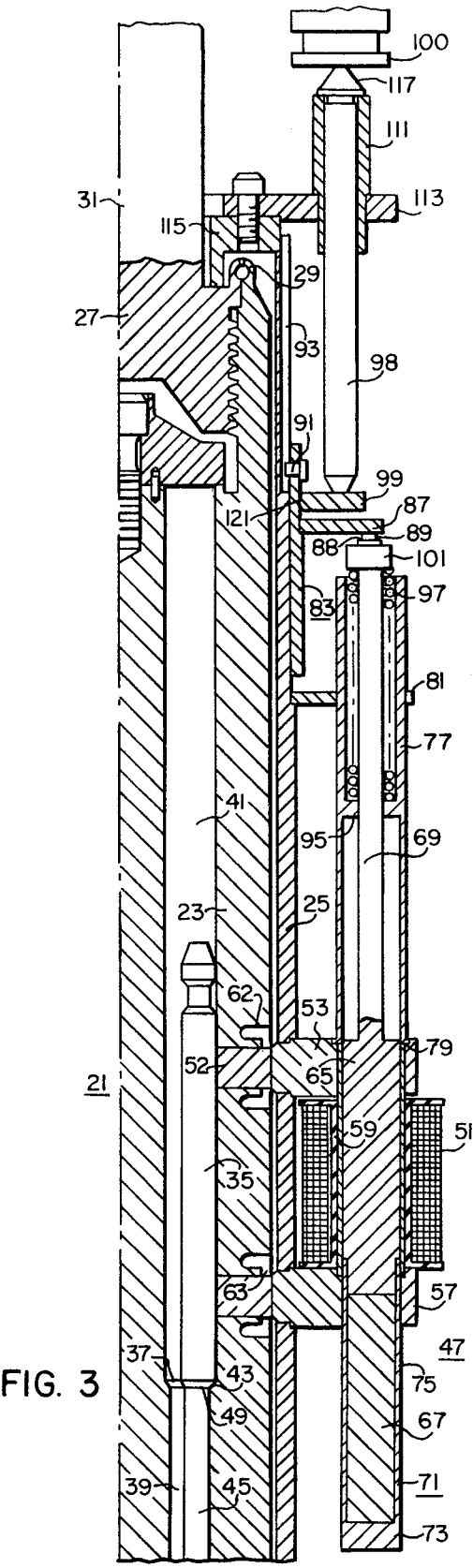
FIG. 3 is a view in section showing one of a plurality of control rod drive mechanisms of a reactor in accordance with this invention in normal operating condition with the control rods retracted.
Figure 4:
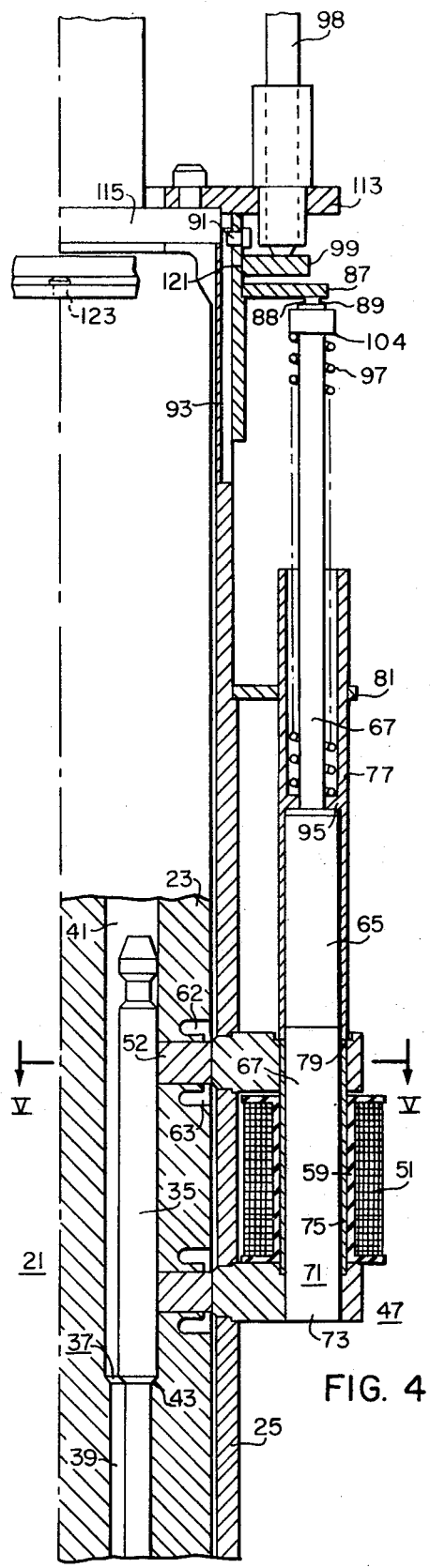
FIG. 4 is a view in section similar to FIG. 3 but with the reactor in refueling condition.

Each control rod drive mechanism 19 in the cluster 17 includes a plurality of control rod assemblies 15, each set individually retractable by the mechanism illustrated in FIGS. 3, 4, 5; and as disclosed in said application Serial No. 700,121. The control rod assemblies are mounted in a circular cluster about the axis of a mechanism housing 23 of non-magnetic material. The housing 23 has at the upper end a pressure-tight closure plug 27 threaded into the housing and sealed by an omega weld 29. Each closure plug 27 terminates in a cylindrical extension 31 which penetrates the missile shield 33 through large clearance holes to provide lateral support for the mechanisms during seismic disturbances (FIGS. 2 and 2A).

The control rod assemblies 15 are each retracted from controlling relationship with the fuel in the core 13 by a piston 35 which operates in a bore 37. The axes of the bores 37 for the mechanisms in each housing 23 extend axially of the mechanism housing 23 and are located on a circle around the axis of the housing. Each bore 37 has a lower portion 39, where the piston 35 is located when the control rods 15 are in controlling relationship with the fuel 13 and an upper portion 41 of larger diameter than the lower portion 39, where the piston is located when the control rods 15 are retracted. The portions 39 and 41 are joined by a tapered ledge 43.

The diameter of the portion 39 is sufficiently larger than the diameter of the piston 35 to permit the piston to slide in portion 39. When the control rod 15 is to be retracted, the pressure in bore 39 above the piston 35 is reduced and the piston is moved from portion 39 into portion 41. The piston 35 is connected to the control rods 15 by a drive rod 45.

The piston 35 is composed of magnetizable material and is held in the portion 41 of the bore 37 by a magnetic assembly 47 which in the practice of this invention inlcudes both electromagnetic holding means and permanent magnet holding means. The piston 35 has a taper 49 at its lower end which engages the ledge 43 when the piston is held.

There are as many magnetic assemblies 47 as there are pistons 35 in each control rod drive mechanism 19. The assemblies 47 are mounted radially in line with each piston around the housing 25 of each mechanism 19 (see FIGS. 2 and 2A).

Each magnetic assembly 47 includes a coil 51 on each end of which there are pole pieces 53 of magnetizable material which are joined by welds 55 to a support tubing of non-magnetic material fitting around the mechanism housing 23 (FIG. 5). Each pole piece 53 has a removable cap 57. There are holes in the pole pieces 53 which are coextensive with the hole in the coil 51. A vertical cylindrical hole thus extends through the pole pieces 53 and coil 51. The hole in the coil is lined by a thin-walled non-magnetic tube 59 which extends somewhat beyond the ends of the coil 51. Magnetic plugs 52, in line with the pole pieces 53, penetrate the mechanism housing 23 to the bore 41. At its inner end 61 the plugs 52 are shaped to conform with the surface of the piston 35, when the latter is in the bore. The plugs 52 are secured to the housing 23 by welds 63 deposited on a tubular section of the housing formed by trepanning 62. The outside ends of the plugs are shaped to blend in with the outside surface of housing 23 and with the surface on the inner ends 54 of pole pieces 53. A magnetic circuit is thus formed through the magnet core, the pole pieces 53, the magnetic plugs 52 and the piston 35. When this circuit is energized, the piston is forced against the wall of bore 41 and downward movement of the piston is prevented by friction and ledge 43.

This magnetic circuit may be energized by coil 51 or by a permanent magnet 67 and for selection of either means there is provided a mechanism having the general operation of a plunger, movable through the holes through the pole pieces 53 and coil 51 and guided by the thin tube 59. This plunger includes an upper cylindrical core section 65 of magnetizable material and a lower section 67 of permanent-magnet material (ALNICO alloy for example). The upper section 65 has an extension 69 in the form of a rod which is actuated to produce the movement of the plunger 65–67 upwardly or downwardly through the holes. The permanent-magnet section 67 is enclosed in a thin-walled protective housing 71. The housing 71 is in the form of a thin cylindrical tube having a cap 73 at the lower end and extending over the lower tip of the upper section 65 which is reduced slightly so that the outer surface of the upper section 65 and of the housing 71 are flush and slide readily in the lining 59. The housing 71 is composed of magnetizable material at its ends but, at its center 75, it is composed of non-magnetic material to reduce magnetic stray flux.

A bushing 77 of non-magnetic material extends around the rod extension 69. The bushing 77 is open at the upper end and is supported between a counterbore 79 in the upper pole piece 53 and a hole in a flange 81 welded to the support tubing 25. A bushing 83 with a flange 87 is mounted slidable on the support tubing 25. The rod 69 is reduced in diameter at its tip 88. At their upper ends 89, the rods 69, which are arranged around support tubing 25 and typically may be eight in number, engage the flange 87. Rotational movement of the bushing 83 is prevented by a pin 91 extending into a slot 93 of the support tubing 25.

The bushing 77 has near its center a partition 95, with a hole through which the rod 69 passes. A spring 97 is disposed in the annulus above this partition between bushing 77 and rod 69. During normal operation of the reactor, the bushing 83 is held in its downmost position by push rods 98 actuated by spring-loaded buttons 100 connected to the missile shield 33 (FIG. 1) acting through push-ring 99. The spring 97 is, in the downmost position of the bushing 83, compressed between the partition 95 and a nut 101 threaded onto the upper end of the rod 69 (FIG. 3). In the downmost position of the bushing 83 the magnetizable core 65 is positioned between pole pieces 53. With the coil 51 energized and the piston 35 in the bore section 41 a magnetic path (circuit) is completed through the core 65, pole pieces 53, plugs 52, piston 35 and the piston is held in section 41. With coil 51 deenergized, there is no magnetic flux and the piston 35 may return the control rods 15 to controlling relationship with the fuel 13 if the pressure above and below the piston 35 is equalized, or the pressure above is greater than that below.

When the missile shield assembly 18 is retracted, the missile shield 33 moves upwardly carrying spring-loaded buttons 100 with it and permitting push rods 98 and bushing 83 to slide to the uppermost position of the bushing. Spring 97 then expands (FIG. 4) pulling rod 69 and the plunger 65–67 upwardly so that permanent magnet core 67 replaces core 65 between the pole pieces 53. A magnetic field is now established through the magnet core 67, pole-pieces 53, plugs 52 and piston 35 to hold piston 35 in the bore section 41 independently of whether or not the coil 51 is energized.

Each push-rod 98 is slidable in a bushing 111 welded to a plate 113, which typically may be square. The plate 113 is secured to a bushing 115 welded to the upper end of the support tubing 25. The head 117 of push-rod 98 engages the end of bushing 111 in its downmost position (FIG. 3) and thus the downward movement of the push rod is limited.

The inner periphery 121 of the push-ring 99 is rounded so that the push-ring 99 rocks on sliding bushing 83. The push-ring 99 is seated on two diametrically located pivots 123 extending from flange 87. The force exerted by the push-rods 98 near the periphery of the push-rings 99 acts through the pivots 123 to advance sleeve 83 downwardly. Even force distribution on sliding bushing 83 is thus assured in case of misalignment in position of buttons 100, and binding of bushing 83 is avoided.

The missile shield assembly 18 includes the heavy circular plate 33 reinforced on the upper side by deep vertical ribs 125; the ribs 125 may be welded to the plate 33 or the plate and ribs may be cast. The lower surface 127 of the plate 33 should preferably be machined so that it is flat. The missle shield, which serves as the lifting rig for the upper package of the reactor 11, is located directly above the control rod mechanisms 19 and is supported on four, equally spaced, lifting rods 129 (only one shown). The rods 129 are located around the periphery of the mechanism complex 17 and are secured by threading the brackets (not shown) welded to the closure head (not shown) of the reactor. The upper ends 131 of the rods 129 enter the shield plate 35 through holes with adequate clearance to permit the desired vertical movement of the shield 33. During normal reactor operation, the shield rests on shoulders 133 of the lifting rods 129. Raising of the shield 33 is achieved by hydraulic cylinders 135, located directly under the shield 33 and supported on shoulders 137 of the lifting rods 129. When hydraulic pressure is applied under the annular pistons 139, the shield 33 is lifted. The rods 129 carry a latching mechanism 141 for latching the shield in the raised or lowered position. The shield is provided with lugs 143 for attaching the rig (not shown) that lifts the upper part or package of the reactor mechanism.

The spring-loaded buttons 100 are secured in the missile shield 33. In the normal, downmost position of the shield assembly 18, the buttons move the push-rods 98 to hold the piston 35. When, during refueling, the shield 33 is raised the buttons 100 are retracted and the spring 97 expands to set permanent magnet core 67 to hold piston 35. As a precaution the coils 51 remain energized during the refueling interval. After refueling the upper package is replaced on the pressure vessel (not shown) of the reactor 11, the missile shield 33 is lowered and the reactor is set for normal operation.

To replace a coil 51, the support tubing 25 is removed from the mechanism housing 23. Then the bushing 83, the spring 97, the bushing 77 and the rod 69 and cores 65 and 67 are pulled out through the hole in flange 81. The end caps 57 are then removed from the pole-piece 53 and the coil 51 and tube 59 are removed radially and replaced with the new coil 51.

Other embodiments of this invention than the one disclosed herein are feasible. This invention then is not to be restricted except insofar as is necessitated by the spirit of the prior art and the scope of the appended claims.

We claim as our invention:

1. A nuclear reactor comprising a pressure vessel containing a core having stationary fuel elements and vertically movable control rods in the core, multiple clusters of control rod drive mechanisms surmounting said pressure vessel, each of said drive mechanisms including a housing having multiple cylinders therein, a piston in each of said cylinders, and a drive rod connecting each piston with at least one control rod, the improvement comprising:

assemblies mounted on each housing, each assembly being mounted in a position outwardly from each of said cylinders and extending parallel thereto:

electromagnetic means removably mounted on each assembly and in a position opposite said piston when the control rods are withdrawn from the core;

a plunger reciprocally movable in said electromagnetic means;

said plunger including a shaft having a magnetizable material and permanently magnetized material thereon, and means associated with each assembly for selectively moving said magnetizable material or said permanently magnetized material on the plunger into said electromagnetic means and in magnetic coupling relationship with said piston, the arrangement being such that when the magnetizable material is in the electromagnetic means and the latter is energized, magnetic flux acts to hold the piston in a stationary position, and when the permanently magnetized material is in the electromagnetic means and the latter is not energized, magnetic flux from the permanently magnetized material holds the piston in a stationary position.

2. The combination according to claim 1 wherein the plunger shaft is guided during movement in an enclosure; and spring means in said enclosure for biasing the magnetizable material out of said electromagnetic means.

3. The combination according to claim 1 wherein said electromagnetic means comprises a coil mounted on said assembly and said plunger is adapted for movement in said coil; and magnetic means on opposite sides of said coil in alignment with a magnetic material in the walls of said housing, said magnetic means and magnetic material comprising a path for flux generated by said coil which links the piston to hold its attached control rod out of neutron controlling relationship with said core.

4. The combination according to claim 1 wherein the means associated with each assembly comprises a device movably mounted on said housing;

a missile shield surmounting said reactor;

means interconnecting the missile shield with said device; and means on the reactor for raising the shield vertically, the arrangement being such that when the shield is in its lower position, the interconnecting means cooperates with said device to hold the magnetizable material on the plunger in the electromagnetic means, and when the shield is raised, the interconnecting means permits upward movement of the plunger to permit the permanently magnetized material to be positioned in the electromagnetic means.

5. The combination according to claim 3 wherein a spring is positioned in said assembly and engages one end of said plunger to bias the magnetizable material in a direction out of the coil;

a missile shield surmounting said reactor;

means on said reactor for raising the shield vertically; and means interconnecting the missile shield with said plunger so that when the shield is raised, the magnetizable material on the plunger is moved out of the coil and the permanently magnetized material is moved into said coil and into a magnetic coupling arrangement with the piston.

* * * * *